No. 784,790. PATENTED MAR. 14, 1905.
C. F. HAWLEY.
GUIDE FOR BATTERY STEMS.
APPLICATION FILED APR. 23, 1904.
3 SHEETS—SHEET 1.
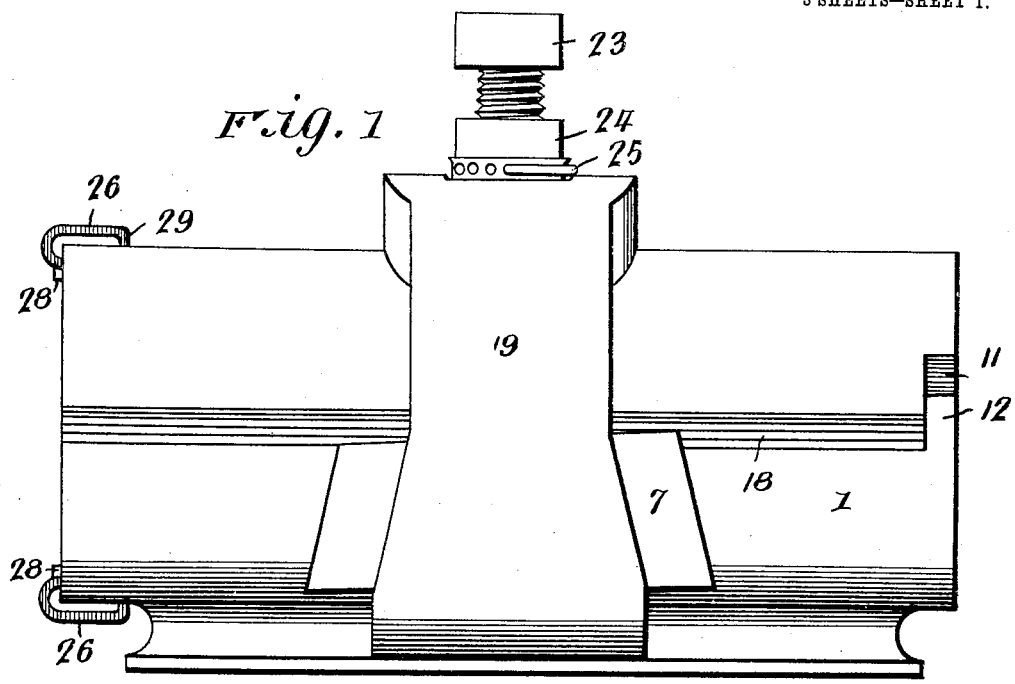
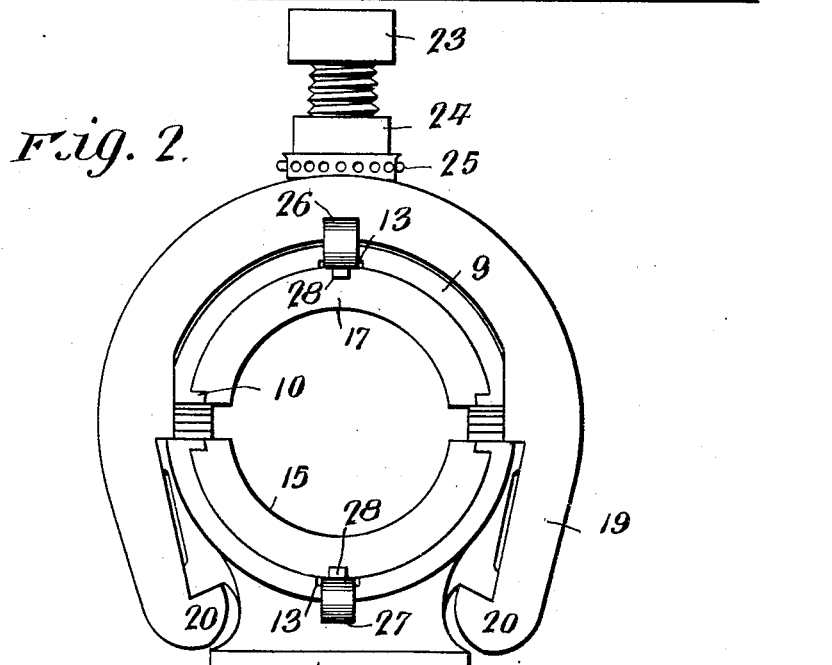
Inventor
Charles F. Hawley,
Witnesses
By Victor J. Evans
Attorney No. 784,790. PATENTED MAR. 14, 1905.
C. F. HAWLEY.
GUIDE FOR BATTERY STEMS.
APPLICATION FILED APR. 23, 1904.
3 SHEETS—SHEET 2.
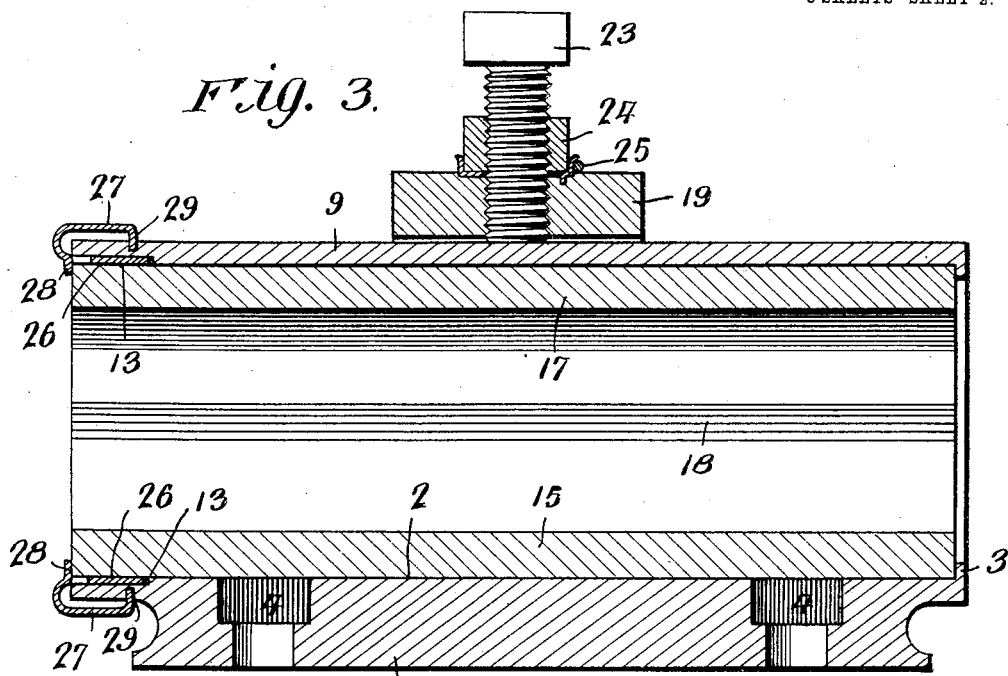
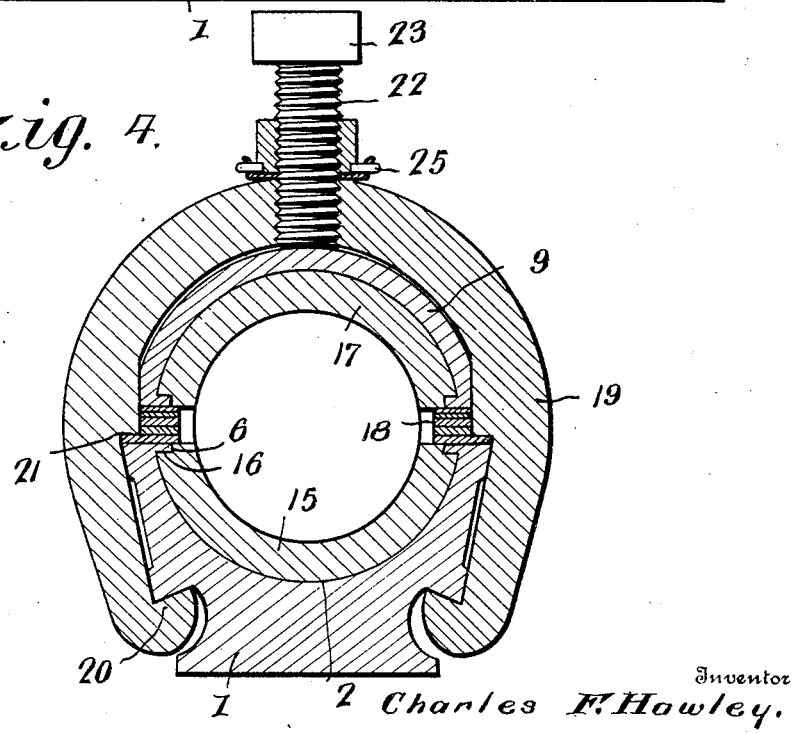
Witnesses
Inventor
Charles F. Hawley.
By Victor J. Evans
Attorney No. 784,790. PATENTED MAR. 14, 1905.
C. F. HAWLEY.
GUIDE FOR BATTERY STEMS.
APPLICATION FILED APR. 23, 1904.
3 SHEETS—SHEET 3.
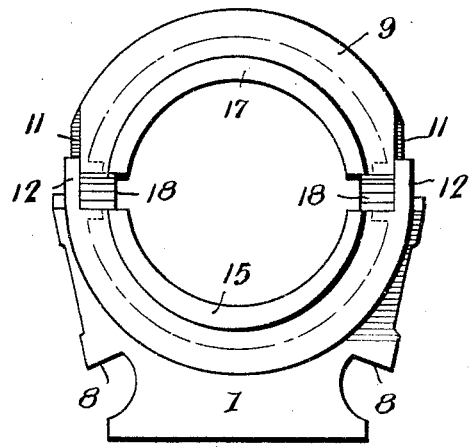
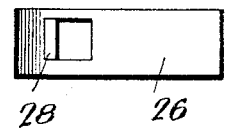
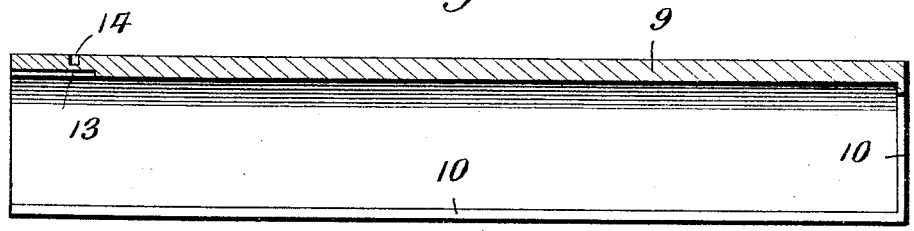
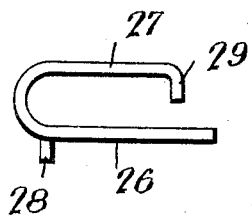
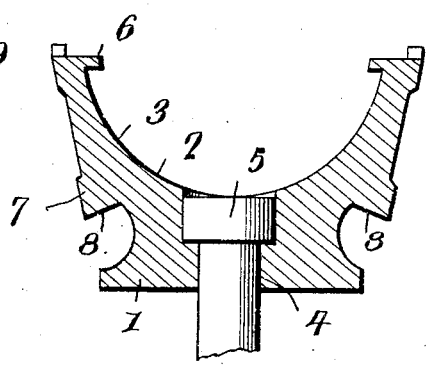
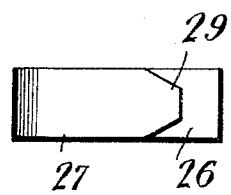
Inventor
Charles F. Hawley.
Witnesses
By Victor J. Evans
Attorney No. 784,790. Patented March 14, 1905.

UNITED STATES PATENT OFFICE.

CHARLES F. HAWLEY, OF HEPPNER, OREGON.

GUIDE FOR BATTERY-STEMS.

SPECIFICATION forming part of Letters Patent No. 784,790, dated March 14, 1905.

Application filed April 23, 1904. Serial No. 204,628.

*To all whom it may concern:*

Be it known that I, CHARLES F. HAWLEY, a citizen of the United States, residing at Heppner, in the county of Morrow and State of Oregon, have invented new and useful Improvements in Guides for Battery-Stems, of which the following is a specification.

My invention relates to new and useful improvements in guides for the stems of stamps such as used in quartz-mills; and its object is to provide a substantially frictionless bearing for the stem, said bearing being removable so as to permit replacement in case of wear or breakage of the bearing or stem.

Another object is to provide a guide which will reduce to the minimum the amount of noise ordinarily produced in a stamp-mill.

In quartz-mills heretofore constructed it has been necessary in the event of the breakage of one of the stamp-stems to remove the bearings of the stems of all the stamps of the battery in order to make the necessary repairs, and the same operation has been found necessary whenever changes in the bearings are to be made.

My invention consists of a bed and a cap, which are oppositely disposed and serve to hold in place two semicylindrical lining-sections, which form the bearing for the stem of one stamp of the battery. The bed and cap are detachably connected by a yoke of novel construction and can be detached and the lining removed without removing the bearings of the other stems of the battery.

The invention also consists in the further novel construction and combination of parts hereinafter more fully described and claimed, and illustrated in the accompanying drawings, showing the preferred form of my invention, and in which—

Figure 1 is a side elevation of my improved guide. Fig. 2 is an end elevation thereof. Fig. 3 is a vertical longitudinal section. Fig. 4 is a central vertical transverse section. Fig. 5 is an end elevation of the bed, cap, and lining. Fig. 6 is a central longitudinal section through the cap. Fig. 7 is a transverse section through the bed and showing an anchor-bolt. Fig. 8 is a bottom plan view of one of the lining-clips. Fig. 9 is a side elevation thereof, and Fig. 10 is a top plan view thereof.

Referring to the figures by numerals of reference, 1 is a bed having a semicylindrical longitudinally-extending recess 2 in one face and provided at one end with a retaining-flange 3. Countersunk passages 4 extend through the bed for the reception of anchor-bolts 5. Inwardly-extending flanges 6 are arranged along the side edges of the recess 2, and extensions 7 are formed integral with the sides of the bed 1. The lower faces of these extensions are inclined upward and inward, as shown at 8, and are preferably slightly inclined from one end to the other, as shown in Fig. 1. A substantially semicylindrical cap 9 is arranged longitudinally upon the bed 1 and has an inwardly-extending flange 10 at the side edges thereof and at one end. The outer face of this cap is flattened adjacent the side edges, and grooves 11 are formed in one end of the cap for the reception of arms 12, which extend from the bed 1. A longitudinally-extending groove 13 is formed in the inner face of the cap 9 at the end thereof farthest removed from flange 10, and a similar groove is formed in a corresponding end of the bed 1. Recesses 14 are formed in the outer faces of the cap and bed adjacent the grooves 13. These grooves and recesses are for the purpose more fully hereinafter described.

Arranged within the recess 2 is a semicylindrical lining-section 15, formed of wood, wood fiber, or any other suitable material, and which is adapted to abut against the end flange 3 and which has longitudinally-extending grooves 16 for the reception of the side flanges 6. The inner or working face of this lining-section is semicylindrical in form. A similar lining-section 17 is arranged within the cap 9 and fits against the flanges 10, and the inner faces of the two sections 15 and 17 form a bearing for the stem of a stamp. Metallic shims 18 are arranged between the adjoining edges of the bed and the cap and extend longitudinally thereof.

A yoke 19 is adapted to straddle the central portion of the cap 9, and the ends thereof are provided with inwardly-extending ears 20, which are adapted to be moved longitudinally under and into engagement with the inclined faces 8 of the extensions 7. Shoulders 21 are formed on the inner faces of the yoke at opposite sides thereof and are adapted to fit snugly against the flattened sides of the cap and to rest upon the side edges of the bed. A set-screw 22 is arranged within the center of the yoke 19 and has a head 23, by means of which the same can be readily turned inward against the cap. A locking-nut 24 is arranged on the set-screw and is provided with a nut-lock 25 of any suitable construction for holding it against rotation.

Retaining-clips are provided for preventing the accidental displacement of the lining-sections 15 and 17. Each of these clips is formed in a single piece of sheet metal, which is bent upon itself to form parallel arms 26 and 27. Arm 26 has an ear 28 struck therefrom, while the end of arm 27 is beveled and bent inward at right angles thereto, as shown at 29. These clips are fastened in position by sliding the arms 26 into grooves 13 and placing the ends 29 in engagement with the recesses 14. Ears 28 thus assume positions over the ends of the lining-sections 15 and 17, as shown in Fig. 3, and serve to hold said sections against movement in one direction.

One guide, such as herein described, is adapted to be used for the stem of each stamp in a battery, and it will be understood that by providing guides of this construction the stems can be removed and replaced and the lining-sections 15 and 17 also removed and replaced without necessarily detaching the parts of the guides of the other stamp-stems. The various parts of the guide can be readily replaced in case of wear or breakage, and when once secured in the manner herein described they are firmly held against accidental displacement, as often occurs as a result of the vibrations produced during the stamping operation. By providing inclined extensions 7 on the sides of the bed 1 the parts are caused to bind more firmly when longitudinal pressure is exerted thereupon.

While I have described this device as especially adapted for use upon the stems of stamps, it will be understood that the same can also be employed as a bearing for shafts, &c.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

1. In a device of the character described, the combination with a bed having integral flanges; of a flanged cap extending longitudinally of the bed, inclined extensions upon the opposite sides of the bed, a yoke straddling the cap and engaging an inclined face of each extension, said yoke being formed in a single piece of material, binding means within the yoke and bearing on the cap, and detachable lining-sections within the bed and cap.

2. In a device of the character described, the combination with a bed having extensions on the sides thereof forming shoulders inclined from end to end, and inwardly-extending flanges integral with the bed; of a flanged cap extending longitudinally of the bed, a yoke formed in a single piece and adapted to straddle the cap and engage the shoulders of the extensions, lining-sections within the bed and the cap and engaged by the flanges, and spring retaining-clips for preventing longitudinal movement of the sections.

3. In a device of the character described, the combination with a bed having inwardly-extending flanges at the edges and one end thereof, and extensions upon the sides of the bed forming shoulders inclined from end to end; of a cap arranged longitudinally upon the bed and having inwardly-extending flanges at its edges and one end, substantially semicylindrical lining-sections within the bed and cap and retained by the flanges thereof, said sections being removable longitudinally, spring retaining-clips engaging the bed and cap, respectively, and overlapping the lining-sections, a yoke formed in a single piece and straddling the cap and bed, said yoke engaging the inclined shoulders of the extensions, and a clamping device within the yoke adapted to bear on the cap.

4. In a device of the character described, the combination with a bed formed in a single casting and having a semicylindrical recess in one face, and extensions at the sides of the bed forming shoulders inclined from one end to the other; of a semicylindrical cap arranged longitudinally upon the bed and having its outer walls reduced and having the outer faces of its walls parallel adjacent the edges of the cap, whereby a portion of each edge of the bed is exposed, detachable lining-sections secured within the cap and bed to form a cylindrical bearing-surface, a yoke straddling the cap and bed, inwardly-extending ears integral with the yoke and engaging the inclined shoulders of the extensions, said yoke having shoulders upon its inner faces adapted to rest upon the bed at opposite sides of the cap, and a binding device within the yoke and adapted to contact with the cap.

In testimony whereof I affix my signature in presence of two witnesses.

CHARLES F. HAWLEY.

Witnesses:
PHIL METSCHAN, Jr.,
C. E. WOODSON.